United States Patent [19]
Greenfield et al.

[11] 3,923,891

[45] Dec. 2, 1975

[54] HYDROGENATION OF BENZONITRILE TO DIBENZYLAMINE

[75] Inventors: Harold Greenfield, Watertown; Ronald S. Sekellick, Naugatuck, both of Conn.

[73] Assignee: Uniroyal, Inc., New York, N.Y.

[22] Filed: Jan. 18, 1973

[21] Appl. No.: 324,684

[52] U.S. Cl............................ 260/570.9; 260/558 R
[51] Int. Cl.² ......................................... C07C 87/29
[58] Field of Search .................................. 260/570.9

[56] References Cited
UNITED STATES PATENTS 3,117,162   1/1964   Rylander et al. ............ 260/570.9 X

OTHER PUBLICATIONS

Paal et al., "Berichte", Vol. 42, pp. 1554–1558 (1909).

*Primary Examiner*—R. V. Hines
*Attorney, Agent, or Firm*—Bert J. Lewen, Esq.

[57] ABSTRACT

Benzonitrile is hydrogenated over a platinum catalyst to form dibenzylamine in the presence of a small amount of water. The reaction may be carried out at moderate conditions of temperature and pressure.

6 Claims, No Drawings

HYDROGENATION OF BENZONITRILE TO DIBENZYLAMINE

DESCRIPTION OF THE INVENTION

This invention relates to an improved process for making dibenzylamine from benzonitrile. More specifically, the invention teaches a process of hydrogenating benzonitrile in the presence of a small amount of water at high conversions and selectivity.

Dibenzylamine is an important item of commerce. It is useful as an accelerator for curing rubbers and plastics and as a chemical intermediate.

The catalytic hydrogenation of benzonitrile is well known. The process is not totally satisfactory because of the large number of by-products formed in the reaction, poor conversions of the benzonitrile, and rapid catalyst deactivation caused by the products of the reaction.

Attempts to improve the reaction conversion and selectivity by the use of solvents have been generally unsuccessful.

In accordance with the invention, it has been found that the platinum-catalyzed hydrogenation of benzonitrile to dibenzylamine may be markedly improved by carrying out the reaction in the presence of water. The water serves to eliminate the deactivation of the catalyst, thereby requiring much lower catalyst concentrations, and permits the reaction to be carried out under mild conditions of temperature and pressure. The dibenzylamine product is obtained in excellent yields.

The amount of water is best expressed in terms of parts by weight per 100 parts of benzonitrile in the feed. Broadly, from 3 to 50 parts may be used, preferably from 6 to 25 parts.

The reaction is carried out in the presence of the benzonitrile and water. No solvent is necessary nor desirable. In a preferred embodiment of the invention, any unreacted benzonitrile and the benzylamine are recycled to the reactor without separation from one another.

Platinum is the catalyst used in the invention. It is considerably superior to the other hydrogenation catalysts, even to those in the platinum group, such as rhodium and palladium. The catalyst may be obtained from the conventional commercial sources and may be either unsupported or supported on a suitable carrier.

The amount of catalyst (using a 5% supported catalyst as a reference) in a batch operation should range from 0.1 to 5 parts, preferably from 0.2 to 1, based on 100 parts by weight of the benzonitrile. Greater amounts may be used, but this does not serve any constructive purpose in advancing the reaction. Comparable amounts may be used in continuous operation as may be readily determined by those skilled in the art.

Preferably the catalyst is supported on a carrier, such as carbon, aluminum or kieselguhr. It may be used as a powder for slurry reactions or as pellets, spheres or granules for fixed bed reactions. The active ingredient of the catalyst is the metallic platinum, but it can be formed in situ from a suitable precursor, such as platinum oxide, if so desired. The aforesaid platinum catalysts are well known to those skilled in the art.

The hydrogenation may be run over a broad range of temperature, namely, from 15° to 225°C., preferably from 20° to 175° C. Temperatures of 50° to 100°C. are most economical at moderate pressures.

The pressure of the reaction is not critical and is basically set by economic considerations. Generally, the reaction may be run from atmospheric pressure to 5000 psig. Most preferred are pressures from 300 to 1200 psig.

The reaction must be carried out with a significant partial pressure of hydrogen; therefore, because of the potentially high vapor pressure of ammonia formed during the reaction, it is necessary to select a reaction temperature which permits a sufficient partial pressure of hydrogen. The exact conditions will depend on the optimum combination of temperature, pressure, catalyst level and cycle time.

The hydrogenation reaction may be carried out in either batch or continuous systems with either tank or pipeline or tubular reactors, in the operating manners well known to those skilled in the art.

In order to more fully describe the instant invention, attention is directed to the following Examples.

EXAMPLE I

In this Example, the benzonitrile, water and platinum catalyst were added to a 600 ml stainless steel Magne Drive autoclave. The vessel was sealed, purged first with nitrogen and then with hydrogen, and pressured with hydrogen to the desired reaction pressure. The autoclave was heated to the desired temperature with agitation. The period of hydrogen absorption and reaction time were noted. The product was analyzed to ascertain the yield of dibenzylamine and the unreacted benzonitrile as well as by-products of the reaction.

In each of the Runs A through G, 206 g. (2.0 mole) of benzonitrile were employed. The catalyst contained 5% by weight platinum on carbon. Unless otherwise noted, the reaction pressure was from 300 to 500 psig.

Table A summarizes Run A to G:

TABLE A

| Run | A | B | C | D[1] | E | F[1] | G[1] |
|---|---|---|---|---|---|---|---|
| Benzonitrile, grams | 206 | 206 | 206 | 206 | 206 | 206 | 206 |
| Water, grams | 27. | 38 | 38 | 38 | 38 | 38 | 38 |
| Parts H$_2$O/100 parts benzonitrile | 13 | 18 | 18 | 18 | 18 | 18 | 18 |
| Catalyst, grams | 4.0 | 4.0 | 2.0[2] | 8.0 | 4.0 | 2.0 | 2.0 |
| Reaction temp, °C. | 100 | 100 | 115–125 | 40–45 | 130 | 115–120 | 115–120 |
| Reaction period, hrs. | 6.8 | 4.5 | 2.3 | 7.0 | 2.7 | 0.8 | 0.5 |
| % Yield - | | | | | | | |
| Dibenzylamine | 96 | 94 | 95 | 95 | 90 | 92 | 89 |
| Benzylamine | 0.4 | 0 | 0 | 0 | 7 | 0 | 0.6 |
| Toluene | 3 | 4 | 7 | 8 | 4 | 9 | 9 |
| Benzamide | 0.2 | 0.2 | 0.4 | 0.2 | 0.5 | 0.1 | 0.1 |

[1]Reaction pressure maintained between 900 and 1200 psig.
[2]A different batch of catalyst was used in this example.

The reaction products were removed from the autoclave after depressurizing and the reaction mixture was filtered through a Celite filter-aid to remove the catalyst. The filtrate was analyzed for recovered benzonitrile and the benzamide by infrared spectroscopy, for toluene by gas-liquid partition chromatography, and for benzylamine and dibenzylamine by titration of the mixture of precipitated and isolated hydrochlorides, and by titration of the hydrochloric acid released from the primary amine in the mixture after treatment with salicylaldehyde.

The above Runs clearly illustrate the advantages of the invention. In Runs A, B and C the yield is in the vicinity of 95%. Run D illustrates that the reaction may be carried out at low temperatures, while Run E shows the use of higher temperatures. Runs F and G illustrate that high pressures may also be used. In all of the above Runs essentially 100% conversion of the benzonitrile occurred in the reaction time noted.

EXAMPLE II

This example shows that the catalyst, when practicing the subject invention, may be used repeatedly.

A mixture of 206 grams (2.0 mole) of benzonitrile, 38 grams of water, and 4.0 grams of 5% platinum on carbon was added to a 600-ml., stainless steel, Magne Drive autoclave. The vessel was sealed, purged first with nitrogen and then with hydrogen, and pressured with hydrogen to 400 psig. The autoclave was heated with agitation for 4.3 hours at 115° and 300–500 psig, with little or no hydrogen absorption in the last 1.5 hours. Analysis of the reaction product indicated no detectable benzonitrile, a 0.2% yield of benzylamine, a 96% yield of dibenzylamine, a 3% yield of toluene, and a 0.2% yield of benzamide.

Using the catalyst recovered, a second run was performed. This time the reaction mixture was heated with agitation for 4.0 hours at 115° and 300–500 psig, with little or no hydrogen absorption in the last 1.5 hours. Analysis of this reaction product indicated no detectable benzonitrile or benzylamine, a 94% yield of dibenzylamine, a 4% yield of toluene, and a 0.3% yield of benzamide.

The catalyst recovered from the second run was used a third time. Here the reaction mixture was heated with agitation for 3.6 hours at 115° and 300–500 psig, with little or no hydrogen absorption in the last 0.8 hour. Analysis of this reaction product indicated no detectable benzonitrile or benzylamine, a 95% yield of dibenzylamine, a 3% yield of toluene, and a 0.5% yield of benzamide.

The above series of runs shows that the catalyst maintains its high activity.

EXAMPLE III

To show that the reaction may be carried out in the presence of benzylamine which may be separated from the reaction product of a previous run, the following experiment was performed:

A mixture of 206 grams (2.0 mole) of benzonitrile, 10.7 grams (0.10 mole) of benzylamine, 38 ml. of water, and 2.0 grams of 5% platinum on carbon was added to a 600-ml., stainless steel, Magne Drive autoclave. The vessel was sealed, purged first with nitrogen and then with hydrogen, and pressured with hydrogen to 400 psig. The autoclave was heated with agitation for 5.4 hours at 120°and 300–500 psig, with little or no hydrogen absorption in the last 1.2 hours. Analysis of the reaction product indicated no detectable benzonitrile, 0.2 mole of benzylamine, a 96% yield of dibenzylamine, a 4% yield of toluene, and a 0.9% yield of benzamide.

This run shows that high yields of dibenzylamine are obtained at 100% conversion of benzonitrile, even in the presence of benzylamine.

COMPARATIVE EXAMPLE A

To show the advantage of the presence of water within the ranges of the invention, the above Examples should be compared to the following data:

A mixture of 206 grams (2.0 mole) of benzonitrile, 4.0 grams of water, and 4.0 grams of 5% platinum on carbon was added to a 600-ml., stainless steel, Magne Drive autoclave. The vessel was sealed, purged first with nitrogen and then with hydrogen, and pressured with hydrogen to 400 psig. The autoclave was heated with agitation for 20.5 hours at 100° and 300–500 psig. Hydrogen was still being slowly absorbed at the end of this time. Analysis of the reaction products indicated a 3% yield of recovered benzonitrile, a 22% yield of benzylamine, a 75% yield of dibenzylamine, a 3% yield of toluene, and a 0.2% yield of benzamide.

It is noted that 3% of the benzonitrile remains unconverted at the end of the reaction. This is caused by catalyst deactivation. Furthermore, the yield of dibenzylamine was considerably less than that obtained by practicing the invention.

The above run was repeated without water at 500 to 800 psig. Despite this higher pressure, after 8.6 hours 6% of the benzonitrile remained unconverted. At this time substantially no more hydrogen was being absorbed.

COMPARATIVE EXAMPLE B

To show the superiority of the platinum catalyst the following runs were performed:

PART I

A mixture of 206 grams (2.0 mole) of benzonitrile, 38 grams of water, and 4.0 grams of 5% palladium on carbon was added to a 600-ml., stainless steel, Magne Drive autoclave. The vessel was sealed, purged first with nitrogen and then with hydrogen, and pressured with hydrogen to 400 psig. The autoclave was heated with agitation for 6.3 hours at 100° C. and 300-500 psig. Hydrogen was still being absorbed at the end of this time. Analysis of the reaction product indicated no detectable benzonitrile, a 19% yield of benzylamine, a 49% yield of dibenzylamine, a 30% yield of toluene, and a 0.3% yield of benzamide.

PART II

A mixture of 206 grams (2.0 mole) of benzonitrile, 38 grams of water, and 2.0 grams of 5% rhodium on carbon was added to a 1.7-liter, stainless steel, rocking autoclave. The vessel was sealed, purged first with nitrogen, and then with hydrogen and pressured with hydrogen to 1000 psig. The autoclave was heated with agitation for 5.3 hours at 100°–110° C. and 900–1200 psig, with little hydrogen absorption in the last 2.3 hours. Analysis of the reaction product indicated no detectable benzonitrile, a 22% yield of benzylamine, a 42% yield of dibenzylamine, a 1% yield of toluene, and no detectable benzamide.

These yields of 49% and 42% of dibenzylamine are considerably less than those obtained with platinum.

We claim:

1. In a process for the hydrogenation of benzonitrile to dibenzylamine, the improvement of carrying out the reaction in the presence of a platinum catalyst and from 3 to 50 parts of water per 100 parts of benzonitrile.

2. The process of claim 1 wherein the amount of water present is 6 to 25 parts per 100 parts of benzonitrile.

3. The process of claim 1 wherein the platinum catalyst is supported on carbon.

4. The process of claim 1 wherein the reaction is carried out at a temperature of from 15° to 225°.

5. The process of claim 1 wherein the process is carried out at a pressure of from 0 to 5000 psig.

6. The process of claim 1 wherein any unreacted benzonitrile is recovered from the reaction product along with benzylamine and the benzonitrile and benzylamine are recycled to the reaction.

* * * * *